US007933311B2

(12) United States Patent
Daniele et al.

(10) Patent No.: US 7,933,311 B2
(45) Date of Patent: *Apr. 26, 2011

(54) DATA TRANSMISSION USING REPEATED SETS OF SPREADING SEQUENCES

(75) Inventors: Norbert Daniele, Montbonnot (FR); Sébastien Leveque, La Cote Saint André (FR); Dominique Noguet, Grenoble (FR); Jean-René Lequepeys, Fontaine (FR)

(73) Assignee: Commissariat A l'Energie Atomique (FR)

( * ) Notice: Subject to any disclaimer, the term of this patent is extended or adjusted under 35 U.S.C. 154(b) by 974 days.

This patent is subject to a terminal disclaimer.

(21) Appl. No.: 11/485,170

(22) Filed: Jul. 11, 2006

(65) Prior Publication Data

US 2006/0280228 A1 Dec. 14, 2006

Related U.S. Application Data

(63) Continuation of application No. 10/030,158, filed as application No. PCT/FR00/02177 on Jul. 28, 2000, now Pat. No. 7,076,007.

(30) Foreign Application Priority Data

Jul. 30, 1999 (FR) ..................................... 99 09947

(51) Int. Cl.
*H04B 1/69* (2006.01)
(52) U.S. Cl. .......................... 375/146; 375/150; 375/152
(58) Field of Classification Search .......... 375/142–144, 375/146–148, 150, 152, 343; 370/335, 342
See application file for complete search history.

(56) References Cited

U.S. PATENT DOCUMENTS

| 5,548,613 | A | * | 8/1996 | Kaku et al. ..................... 375/150 |
| 6,078,576 | A | * | 6/2000 | Schilling et al. ............... 370/347 |
| 6,141,337 | A | * | 10/2000 | Uta et al. ....................... 370/350 |
| 6,160,803 | A | | 12/2000 | Yuen et al. |
| 6,868,077 | B1 | * | 3/2005 | Gourgue et al. .............. 370/342 |
| 2002/0196842 | A1 | | 12/2002 | Onggosanusi et al. |

FOREIGN PATENT DOCUMENTS

EP   0 693 834   1/1996
EP   0 708 534   4/1996

* cited by examiner

*Primary Examiner* — Young T. Tse
(74) *Attorney, Agent, or Firm* — Connolly Bove Lodge & Hutz LLP

(57) ABSTRACT

Disclosed is a data transmission process using repetitive sets of spreading sequences, and corresponding transmitted and receiver. According to the invention, spectrum spreading is done on symbol packets using set of pseudo-random sequences used repetitively. This thus reduces interference between symbols. The present invention is applicable to digital communications by spectrum spreading.

39 Claims, 3 Drawing Sheets

DATA TRANSMISSION USING REPEATED SETS OF SPREADING SEQUENCES

CROSS-REFERENCE TO RELATED APPLICATIONS

This application is a continuation of U.S. application Ser. No. 10/030,158, filed Jan. 30, 2002, now U.S. Pat. No. 7,076,007 which is a National Stage of International Application No. PCT/FR00/02177, filed on Jul. 28, 2000, the entire contents of which are incorporated herein by reference.

TECHNICAL DOMAIN

The purpose of this invention is a process for transmission of data using repetitive sets of spreading sequences, and a corresponding transmitter and receiver.

The invention is broadly applied for digital communications and more particularly for Wireless Local Area Networks (WLANs), Wireless subscriber Local Loops (WLL), mobile telephony, intelligent building management systems and remote charging, communication for transport, cable television, multimedia service on cable networks, etc.

STATE OF PRIOR ART

The invention relates to the spectrum spreading technique. It is known that this technique consists of modulating a digital symbol to be transmitted by a pseudo random sequence known to the user. Each sequence is composed of N elements called "chips" that have a duration of one $N^{th}$ of the duration of a symbol. The result is a signal for which the spectrum is spread over a range N times wider than the range of the original signal. On reception, demodulation consists of correlating the received signal with the sequence used in sending to find the initial symbol.

This technique has many advantages, but it cannot overcome a disadvantage related to an interference effect between symbols which originates as follows. In a radioelectric channel, the wave that propagates from the transmitter to the receiver may follow various paths such that several signals reach the receiver at different time, with different amplitudes and phases, for the same transmitted signal. Therefore the response of the channel to the transmitted signal is spread. Since the sent signal is usually short, it can be treated like a pulse and it is then referred to as a pulse response. In high throughput systems, these various replicas of the same signal can interfere with other signals.

FIG. 1 illustrates this phenomenon. It shows the pulse response h(t) of a channel as a function of time. On part A, it is assumed that a pulse was transmitted at a given time and that a first signal a, was received with a given delay $\tau_1$, followed by a replica $a_2$ at time $\tau_1+Tm$, where Tm is the time by which the second path lags behind the first. On part B, it is assumed that a second signal was sent after an interval Ts equal to the duration of a symbol and it is also assumed that this interval is equal to the delay Tm. It is also assumed that the properties of the channel are not modified within the interval Ts, in other words the delay $\tau_2$ is equal to $\tau_1$ and $T_m$ remains constant. A signal $b_1$ is then received at time $\tau_2$ followed by a replica $b_2$ at time $\tau_2+T_m$.

Since it is assumed that Ts=Tm, it is obvious that the signals $a_2$ and $b_1$ will interfere and degrade reception. This source of degradation can be avoided by taking steps such that $b_1$ appears beyond $a_2$, in other words the duration Ts of the symbols is greater than the spreading Tm of the pulse response. In other words, the symbol flow rate must be less than 1/Tm. The constraint on the flow rate is greater when the pulse response is spread more.

The purpose of the invention is to overcome this disadvantage. By reducing the interference phenomenon between symbols, the invention enables higher flow rates in environments in which spreading of the pulse response of the channel is much greater than the duration of the symbol (up to 16 times in an example described later).

Document EP-A-0 693 834 describes a CDMA type mobile radiocommunication system in which the base station/mobile station link uses one or the other spreading sequence, the sequence being used in sending being identified such that the mobile station can unspread the received signal. The signal can be transmitted on three parallel channels using three different codes, to increase the information flow rate.

DESCRIPTION OF THE INVENTION

The invention recommends that successive symbols should be processed with different pseudo random sequences in order to reduce the risks of interference between symbols, since this makes it possible to better discriminate received signals on reception. According to the invention, the number of different successive sequences is limited to a fixed number S. Beyond S sequences, the previously used sequences are reused. In other words, packets of S symbols can be processed by repetitive sets of S sequences. The result is that the time interval after which the same pseudo random sequence is repeated is no longer Ts, but becomes S times Ts. Therefore the constraint on the duration of the symbol is no longer Ts>Tm, but becomes STs>Tm. In terms of throughput, this means that for a given spreading, the authorized throughput is S times higher than in prior art. The upper limit is no longer 1/Tm, but becomes S/Tm.

This process that consists of processing packets of S symbols in repetitive sets of S pseudo random sequences can be further improved by processing several packets of S symbols in parallel, each with different sequence sets.

Therefore, more precisely, the purpose of the invention is a process for data transmission by spectrum spreading in which:
  in sending: symbols are built up from the data to be transmitted, and are modulated by spectrum spreading using pseudo-random sequences,
  on reception: the received signal is correlated with the pseudo-random sequences used in sending, the symbols sent are found and the data are restored,
this process being characterized in that:
  a) in sending:
    i) a set of S successive different pseudo-random sequences is built up, in which S is equal to at least 2,
    ii) the symbols to be transmitted are grouped into successive packets each containing S symbols,
    iii) the S successive symbols of a packet are modulated by the S successive pseudo-random sequences of the set of sequences,
    iv) operation iii) is repeated for successive packets of S symbols, the pseudo-random sequences in the set thus being used repetitively,
  b) on reception:
the received signal is correlated with each of the S pseudo-random sequences used in sending, the successive packets of symbols are restored and the corresponding data are restored.

The conversion made during transmission could be a summation.

In one particular embodiment, several packets of S symbols are processed in parallel.

Another purpose of the invention is a transmitter and a receiver for embodiment of this process.

DESCRIPTION OF PARTICULAR EMBODIMENTS

Figure 1:
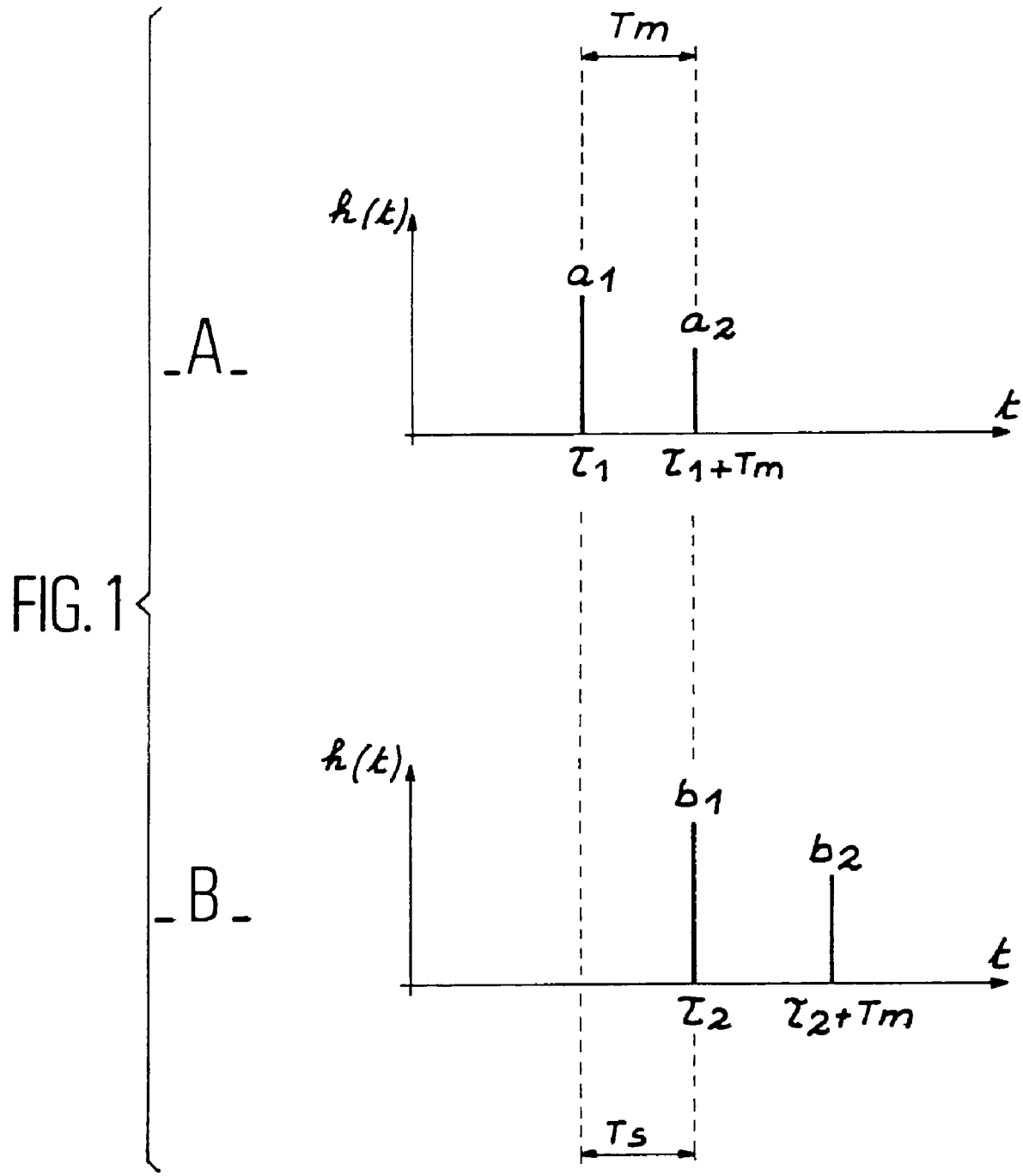
FIG. 1, already described, illustrates the interference phenomenon between symbols.

Data to be transmitted are firstly organized into symbols using standard techniques. Each symbol may include one or several bits. The symbols are then organized in packets of S. If required, parallel processing can also be carried out, L packets of S symbols are used in parallel giving a total of M=LS symbols. The following symbols are organized in the same way to build up a new set of M symbols and so on.

Table I illustrates this series-parallel organization. Each box represents a symbol. The first set of symbols is denoted $$S_{ij}^{1}$$

where i denotes the row in the table, in other words the rank of the packet (where i varies from 1 to L) and j is the column, in other words the rank in the packet (where j varies from 1 to S). In the second set, the LS symbols are denoted $$S_{ij}^{2}$$

and so on.

TABLE I

| | | j | | | | | |
|---|---|---|---|---|---|---|---|
| i | 1 | 2 | S | 1 | 2 | | S |
| 1 | $S_{11}^{1}$ | $S_{12}^{1}$ | $S_{1S}^{1}$ | $S_{11}^{2}$ | $S_{12}^{2}$ | $S_{1S}^{2}$ | $S_{11}^{3}$ |
| 2 | $S_{21}^{1}$ | $S_{22}^{1}$ | $S_{2S}^{1}$ | $S_{21}^{2}$ | $S_{22}^{2}$ | $S_{LS}^{2}$ | $S_{21}^{3}$ |
| | | | $S_{ij}^{1}$ | | | $S_{ij}^{2}$ | |
| L | $S_{L1}^{1}$ | $S_{L2}^{1}$ | $S_{Ls}^{1}$ | $S_{L1}^{2}$ | $S_{L2}^{2}$ | $S_{LS}^{2}$ | $S_{L1}^{3}$ |

All these symbols are processed by spectrum spreading using LS different pseudo-random sequences, preferably orthogonal. These sequences are organized as shown in table II. They are denoted $C_{ij}$, where i varies from 1 to L and j varies from 1 to S.

TABLE II

| | | j | | |
|---|---|---|---|---|
| i | 1 | 2 | $C_{ij}$ | S |
| 1 | $C_{11}$ | $C_{12}$ | | $C_{1S}$ |
| 2 | $C_{21}$ | $C_{22}$ | | $C_{2S}$ |
| L | $C_{L1}$ | $C_{L2}$ | | $C_{LS}$ |

A symbol $S_{ij}$ in table I is processed by the corresponding pseudo-random sequence $C_{ij}$ in table II. When the M sequences have been used for a set of M symbols, the same sequences are reused for the next set of M symbols and so on. Therefore, the interval at which sequences are reused is $ST_S$.

Some numerical examples are given for explanatory purposes to illustrate the advantages provided by the invention; these examples are in no way restrictive. It is assumed that work is done with a binary flow rate of 2 Mbits/s in QPSK (Quaternary Phase Shift Keying) modulation. Therefore the number of bits per symbol is 2. The duration Ts of a symbol is 1 μS. With a process in accordance with the state of prior art, this would mean that spreading of the channel Tm should be limited to 1 μs. The invention uses L channels in parallel (where L=M/S). Therefore the number of bits transmitted in a symbol period Ts is equal to m=2L. Table III contains a few examples of maximum spreading $Tm_{max}$ that can be allowed for two values of M (8 and 16), and 3 values of S (4, 8 and 16 respectively) for each.

TABLE III

| | M = 8 | M = 16 |
|---|---|---|
| S = 4 | m = 4 bits/symb | m = 8 bits/symb |
| | $Tm_{max}$ = 8 μs | $Tm_{max}$ = 16 μs |
| S = 8 | m = 2 bits/symb | m = 4 bits/symb |
| | $Tm_{max}$ = 8 μs | $Tm_{max}$ = 16 μs |
| S = 16 | | m = 2 bits/symb |
| | | $Tm_{max}$ = 16 μs |

Figure 2:
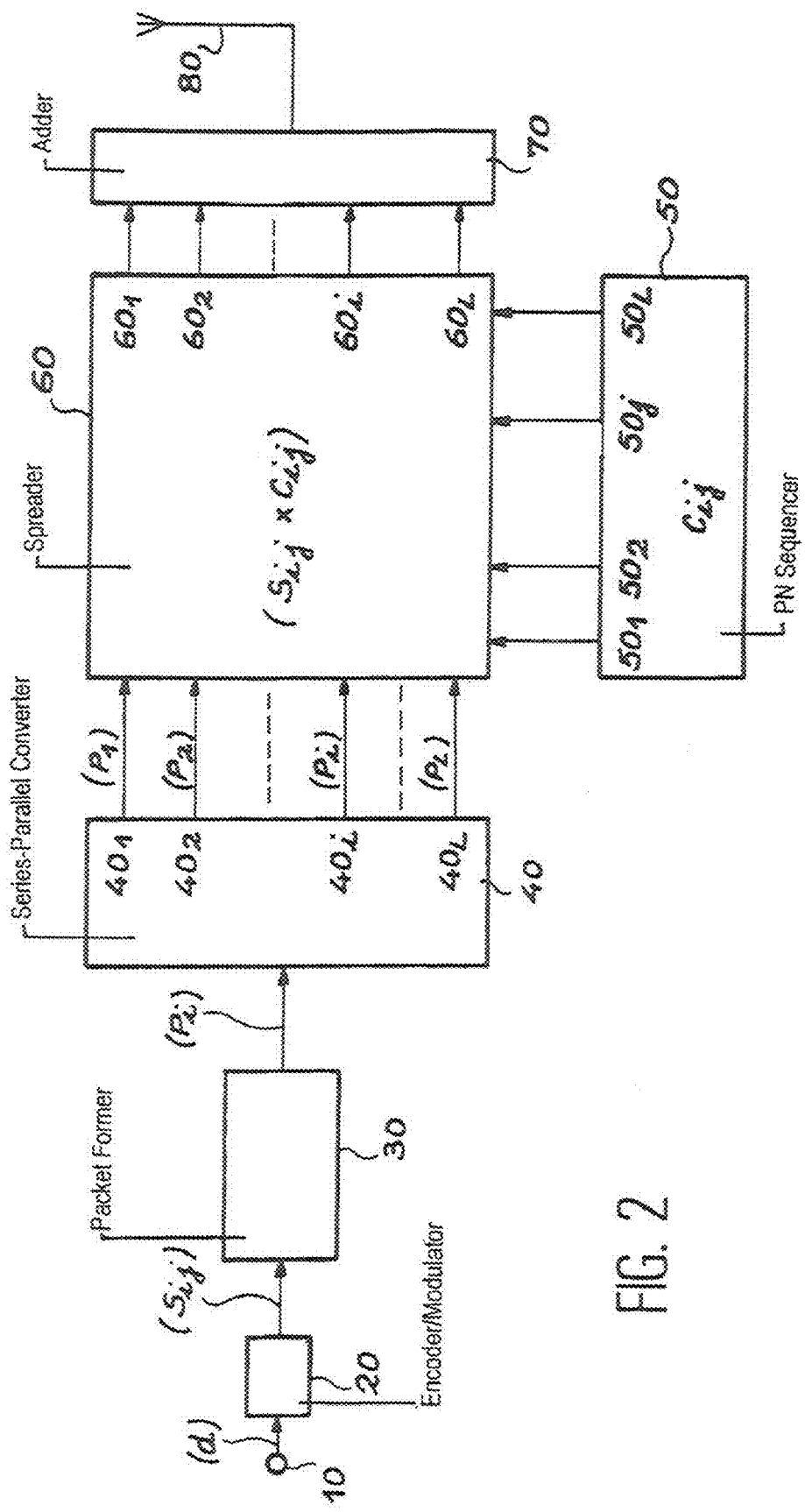
FIG. 2 shows an embodiment of a transmitter according to the invention.
Figure 3:
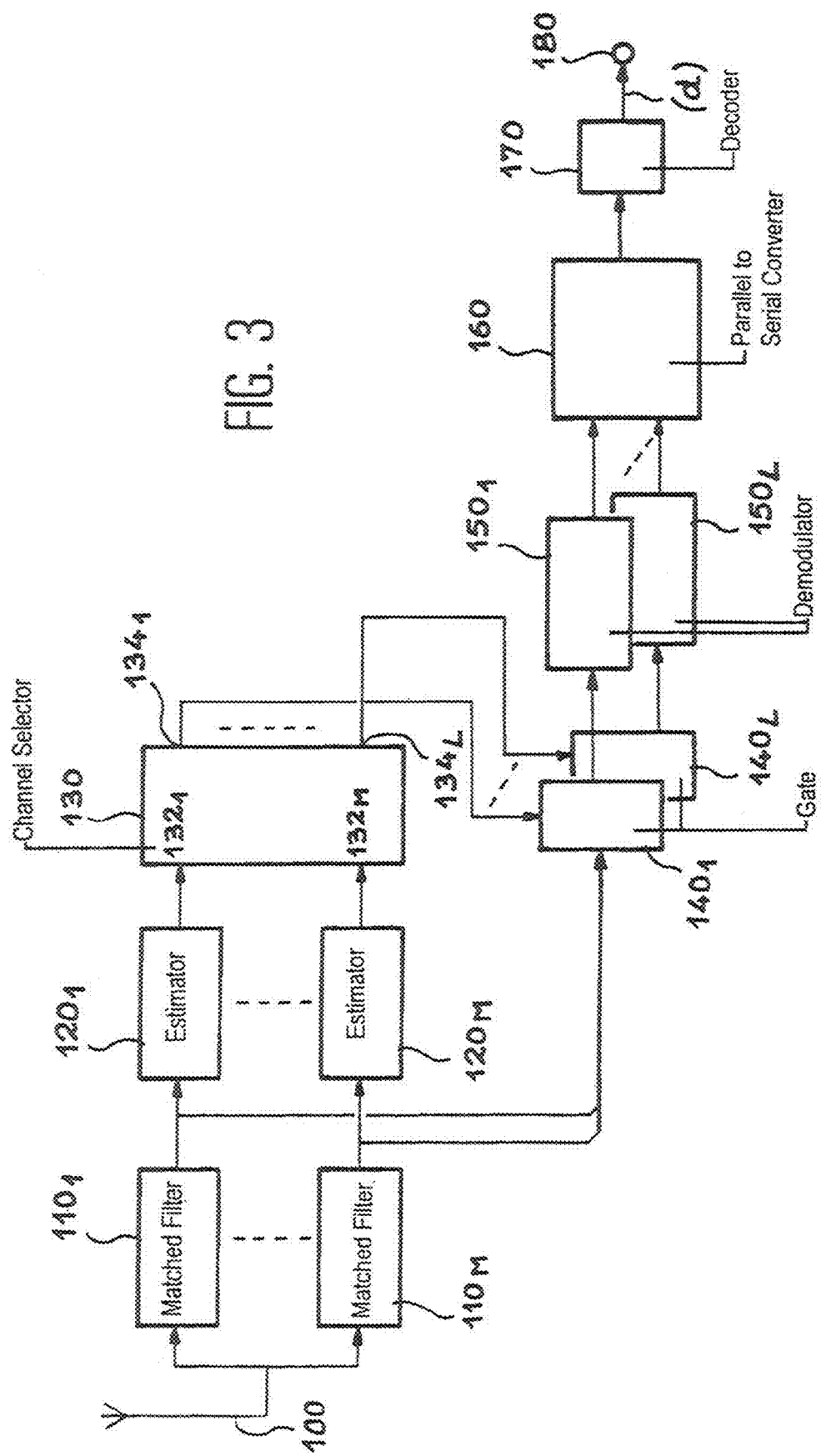
FIG. 3 shows an embodiment of a receiver according to the invention.

FIGS. 2 and 3 illustrate example embodiments of a transmitter and a receiver according to the invention. In FIG. 2, the transmitter comprises a general input 10 into which data d to be transmitted are input, a circuit 20 transforming these data into symbols (it may be phase shift keying (PSK) modulator), a means 30 of forming packets each containing S symbols, namely $P_i$ (i varying from 1 to L). In the variant illustrated, the transmitter comprises a series-parallel converter 40 with L outputs 40$_1$, 40$_2$, ..., 40$_i$, ..., 40$_L$ outputting L packets $P_i$, a table 50 of pseudo-random sequences $C_{ij}$, with L outputs 50$_1$, 50$_2$, ..., 50$_j$, ..., 50$_L$ outputting L sets of sequences, a circuit 60 of spreading symbols $S_{ij}$ with sequences $C_{ij}$, this circuit having L outputs 60$_1$, 60$_2$, ..., 60$_i$, ..., 60$_L$ outputting spread spectrum symbols, an adder 70 and finally transmission means symbolized by an antenna 80.

The receiver shown in FIG. 3 comprises reception means symbolized by the antenna 100, a bank of M matched filters 110$_1$, ..., 110$_M$, each of these filters being matched to one of the pseudo-random sequences $C_{ij}$ used in sending, a bank of M circuits 120$_1$, ..., 120$_M$ estimating the energy (or the amplitude) of signals output by the previous matched filters, a circuit 130 with M inputs 132$_1$, ..., 132$_M$ and L outputs 134$_1$, ..., 134$_L$ determining which of the M input channels contain maximum energy and outputting a selection signal on one or several of the L outputs, L circuits 140$_1$, ..., 140$_L$ with M inputs connected to the outputs of M matched filters and selecting one among M inputs as a function of the received selection signal, L demodulators $150_1, \ldots, 150_L$, for example of the PSK type, a circuit 160 putting L packets of symbols output by the demodulators into series, a circuit 170 restoring data d on a general output 180.

Processing in parallel is simply an option, the essential feature of the invention being that a set of different successive sequences is used.

The invention claimed is:

1. A method for spectrum spread transmission of data symbols, comprising:
    generating a plurality of sets of pseudo-random sequences wherein each sequence of the plurality of sets of pseudo-random sequences differs from each other sequence of the plurality of sets of pseudo-random sequences;
    grouping a plurality of data symbols into a plurality of packets; and
    spreading each data symbol of each of the plurality of packets using a respective different one of the plurality of sets of pseudo-random sequences, wherein the plurality of sets of pseudo-random sequences are used repetitively for each of the plurality of packets.

2. The method of claim 1, wherein generating the plurality of sets of pseudo-random sequences comprises generating S pseudo-random sequences, S being a number.

3. The method of claim 2, wherein grouping the plurality of data symbols into the plurality of packets comprises grouping the plurality of data symbols into packets of S data symbols.

4. The method of claim 3, wherein spreading each data symbol of each of the plurality of packets comprises spreading the S data symbols of each of the plurality of packets using the S pseudo-random sequences.

5. The method of claim 4, wherein S comprises a number equal to or greater than two.

6. The method of claim 2, wherein S is a fixed number.

7. The method of claim 1, further comprising:
    reusing the plurality of sets of pseudo-random sequences to spread the data symbols of each of the plurality of packets.

8. The method of claim 7, wherein said reusing comprises:
    reusing the plurality of sets of pseudo-random sequences in an order previously used to spread the data symbols of each of the plurality of packets.

9. An apparatus capable of spectrum spread transmission of data symbols, comprising:
    means for generating a plurality of sets of pseudo-random sequences wherein each sequence of the plurality of sets of pseudo-random sequences differs from each other sequence of the plurality of sets of pseudo-random sequences;
    means for grouping a plurality of data symbols into a plurality of packets; and
    means for spreading each data symbol of each of the plurality of packets using a respective different one of the plurality of sets of pseudo-random sequences, wherein the plurality of sets of pseudo-random sequences is used repetitively for each of the plurality of packets.

10. The apparatus of claim 9, wherein the means for generating the plurality of sets of pseudo-random sequences generates S pseudo-random sequences, S being a number.

11. The apparatus of claim 10, wherein the means for grouping the plurality of data symbols into the plurality of packets groups S data symbols into each of the plurality of packets.

12. The apparatus of claim 11, wherein the means for spreading each data symbol of each of the plurality of packets spreads the S data symbols of each of the plurality of packets using the S pseudo-random sequences.

13. The apparatus of claim 12, wherein S comprises a number equal to or greater than two.

14. The apparatus of claim 9, wherein said means for spreading is further to reuse the plurality of sets of pseudo-random sequences to spread the data symbols of each of the plurality of packets.

15. The apparatus of claim 14, wherein said means for spreading is further to reuse the plurality of sets of pseudo-random sequences in an order previously used to spread the data symbols of each of the plurality of packets.

16. A method for receiving a spread spectrum transmission of data symbols, comprising:
    correlating different portions of a received signal with a plurality of sets of pseudo-random sequences, wherein each sequence of the plurality of sets of pseudo-random sequences differs from each other sequence of the plurality of sets of pseudo-random sequences, and wherein each of the plurality of sets of pseudo-random sequences was used to spread a respective transmitted data symbol of each of a plurality of packets corresponding to a particular portion of the received signal, wherein the plurality of sets of pseudo-random sequences was used repetitively for each of the plurality of packets; and
    recovering one or more data symbols corresponding to said correlated portions of the received signal.

17. The method of claim 16, wherein said plurality of sets of pseudo-random sequences includes a fixed number of different pseudo-random sequences, and wherein correlating different portions of the received signal with the plurality of sets of pseudo-random sequences comprises reusing the plurality of sets of pseudo-random sequences to successively correlate the different portions of the received signal.

18. The method of claim 16, wherein a number of the plurality of sets of pseudo-random sequences is equal to or greater than two.

19. An apparatus for receiving a spread spectrum transmission of data symbols, comprising:
    means for correlating different portions of a received signal with a plurality of sets of pseudo-random sequences, wherein each sequence of the plurality of sets of pseudo-random sequences differs from each other sequence of the plurality of sets of pseudo-random sequences, and wherein each of the plurality of sets of pseudo-random sequences was used to spread a respective transmitted data symbol of each of a plurality of packets corresponding to a particular portion of the received signal, wherein the plurality of sets of pseudo-random sequences was used repetitively for each of the plurality of packets; and
    means for recovering one or more data symbols corresponding to said correlated portions of the received signal.

20. The apparatus of claim 19, wherein said plurality of sets of pseudo-random sequences includes a fixed number of different pseudo-random sequences, and wherein the means for correlating different portions of the received signal with the plurality of sets of pseudo-random sequences is to reuse the plurality of sets of pseudo-random sequences to successively correlate the different portions of the received signal.

21. The apparatus of claim 19, wherein a number of the plurality of sets of pseudo-random sequences is equal to or greater than two.

22. A method for spectrum spread transmission of data symbols, comprising:
    generating a plurality of pseudo-random sequences wherein each sequence of the plurality of pseudo-random sequences differs from each other sequence of the plurality of pseudo-random sequences;

spreading each data symbol of each of a plurality of packets using a respective different one of the plurality of pseudo-random sequences as long as all of the plurality of pseudo-random sequences have not been used; and reusing the plurality of pseudo-random sequences to spread the data symbols of each of the plurality of packets once all of the plurality of pseudo-random sequences have been used.

23. The method of claim 22, wherein said reusing comprises reusing the plurality of pseudo-random sequences in an order in which they were previously used.

24. The method of claim 22, wherein said reusing is to be repeated as long as the data symbols of each of the plurality of packets remain to be spread.

25. An apparatus for spectrum spread transmission of data symbols, comprising:
   means for generating a plurality of sets of pseudo-random sequences wherein each sequence of the plurality of sets of pseudo-random sequences differs from each other sequence of the plurality of sets of pseudo-random sequences; and
   means for spreading each data symbol of each of a plurality of packets using a respective different one of the plurality of sets of pseudo-random sequences as long as all of the plurality of sets of pseudo-random sequences have not been used, wherein the means for spreading is further configured to reuse the plurality of sets of pseudo-random sequences to spread the data symbols of each of the plurality of packets once all of the plurality of sets of pseudo-random sequences have been used.

26. The apparatus of claim 25, wherein said means for spreading is to reuse the plurality of sets of pseudo-random sequences in an order in which they were previously used.

27. The apparatus of claim 25, wherein said means for spreading is to reuse the plurality of sets of pseudo-random sequences as long as the data symbols of each of the plurality of packets remain to be spread.

28. A spread-spectrum communication apparatus comprising:
   a pseudo-random sequence generator to generate a plurality of sets of pseudo-random sequences, each pseudo-random sequence being different from every other sequence of the plurality of sets of pseudo-random sequences; and
   a spreader to spread each data symbol for each of a plurality of packets using a respective different pseudo-random sequence of said plurality of sets of pseudo-random sequences, wherein each of the plurality of sets of pseudo-random sequences is used repetitively for each of the plurality of packets.

29. The apparatus of claim 28, wherein the spreader is to reuse the plurality of sets of pseudo-random sequences to spread data symbols in the plurality of packets, once all of the plurality of sets of pseudo-random sequences have been used.

30. The apparatus of claim 29, wherein the spreader is to reuse the plurality of sets of pseudo-random sequences in an order in which they were used to spread previous data symbols.

31. The apparatus of claim 28, further comprising:
   a packet forming device to form the plurality of packets from a plurality of data symbols.

32. The apparatus of claim 31, further comprising:
   a serial-to-parallel converter to present a number of the plurality of packets in parallel to said spreader, and wherein said spreader is to output, in parallel, a number of spread-spectrum symbols equal to said number of packets in parallel.

33. The apparatus of claim 32, further comprising:
   an adder to receive the spread-spectrum symbols; and
   a transmitter to receive an output of said adder.

34. A spread-spectrum communication apparatus comprising:
   a correlator to correlate different portions of a received signal with a plurality of sets of pseudo-random sequences, wherein each sequence of the plurality of sets of pseudo-random sequences differs from each other sequence of the plurality of sets of pseudo-random sequences, and each of the plurality of sets of pseudo-random sequences was used to spread a transmitted data symbol of each of a plurality of sets of packets corresponding to a particular portion of the received signal, wherein the plurality of sets of pseudo-random sequences was used repetitively for each of the plurality of packets; and
   a data-restoring circuit coupled to said correlator to output data.

35. The apparatus of claim 34, wherein said correlator comprises:
   a bank of matched filters, each matched filter matched to a particular one of said plurality of sets of pseudo-random sequences.

36. The apparatus of claim 35, further comprising:
   a circuit to determine a maximum output of said bank of matched filters and to select the maximum output as a signal to be demodulated spread.

37. The apparatus of claim 36, further comprising:
   a demodulator coupled to receive the signal to be demodulated spread and having an output coupled to the data-restoring circuit.

38. The apparatus of claim 37, wherein said circuit to determine the maximum output comprises multiple determining circuits, and wherein said demodulator comprises multiple demodulating circuits, each demodulating circuit coupled to receive a signal selected by one of the multiple determining circuits.

39. The apparatus of claim 38, wherein the data-restoring circuit is coupled to a parallel-to-serial converter which is coupled to receive outputs of the demodulating circuits.

* * * * *

UNITED STATES PATENT AND TRADEMARK OFFICE
CERTIFICATE OF CORRECTION

PATENT NO.         : 7,933,311 B2
APPLICATION NO.    : 11/485170
DATED              : April 26, 2011
INVENTOR(S)        : Daniele et al.

Page 1 of 1

It is certified that error appears in the above-identified patent and that said Letters Patent is hereby corrected as shown below:

Title page, item (73), under "Assignee", in Column 1, Line 1, delete "l'Energie" and insert -- L'Energie --.

Column 5, line 9, in Claim 1, delete "spectrum spread transmission" and insert -- spread spectrum transmission --.

Column 5, line 43, in Claim 9, delete "spectrum spread transmission" and insert -- spread spectrum transmission --.

Column 6, line 62, in Claim 22, delete "spectrum spread transmission" and insert -- spread spectrum transmission --.

Column 7, line 16, in Claim 25, delete "spectrum spread transmission" and insert -- spread spectrum transmission --.

Column 8, line 41, in Claim 36, delete "demodulated spread." and insert -- demodulated. --.

Column 8, lines 43-44, in Claim 37, delete "demodulated spread" and insert -- demodulated --.

Signed and Sealed this
Twenty-ninth Day of November, 2011

David J. Kappos
*Director of the United States Patent and Trademark Office*